(12) United States Patent
Zhong

(10) Patent No.: US 11,101,908 B2
(45) Date of Patent: Aug. 24, 2021

(54) SERVICE DATA TRANSMISSION METHOD AND APPARATUS

(71) Applicant: Huawei Technologies Co., Ltd., Shenzhen (CN)

(72) Inventor: Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/862,019

(22) Filed: Apr. 29, 2020

(65) Prior Publication Data

US 2020/0259580 A1     Aug. 13, 2020

Related U.S. Application Data

(63) Continuation of application No. PCT/CN2018/111841, filed on Oct. 25, 2018.

(30) Foreign Application Priority Data

Oct. 31, 2017   (CN) .......................... 201711051297.4

(51) Int. Cl.
*H04J 3/16* (2006.01)
*H04J 3/24* (2006.01)

(52) U.S. Cl.
CPC . *H04J 3/16* (2013.01); *H04J 3/24* (2013.01)

(58) Field of Classification Search
CPC ................ H04J 3/1611; H04J 3/1658; H04J 2203/0003; H04J 2203/0089;

(Continued)

(56) References Cited

U.S. PATENT DOCUMENTS

2012/0163347 A1  6/2012 Joo
2016/0050044 A1  2/2016 Liu
(Continued)

FOREIGN PATENT DOCUMENTS

CN   102333315 A   1/2012
CN   104066017 A   9/2014
(Continued)

OTHER PUBLICATIONS

"Flex Ethernet, Implementation Agreement," IA # OIF-FLEXE-01. 0, Mar. 2016, 31 pages.

(Continued)

*Primary Examiner* — Jung Liu
(74) *Attorney, Agent, or Firm* — Conley Rose, P.C.

(57) ABSTRACT

A service data transmission method includes determining, by a first device, a switching request, and sending, by the first device, the switching request to a second device, where the first device is connected to the second device using a flexible Ethernet (FlexE) group including at least one FlexE connection instance (FlexE Instance). The switching request includes first slot configuration information and second slot configuration information, the switching request is used to request to switch a slot configuration of a FlexE Instance from a configuration indicated by the first slot configuration information to a configuration indicated by the second slot configuration information, and a slot division quantity indicated by the first slot configuration information is different from a slot division quantity indicated by the second slot configuration information.

20 Claims, 7 Drawing Sheets

```
┌─────────────────────────────────────────────────────┐
│  A first device determines a switching request      │──── S201
└─────────────────────────────────────────────────────┘
                         │
                         ▼
┌─────────────────────────────────────────────────────┐
│ The first device sends the switching request to a   │──── S202
│                    second device                    │
└─────────────────────────────────────────────────────┘
                         │
                         ▼
┌─────────────────────────────────────────────────────┐
│ The second device determines to switch a            │
│ configuration indicated by first slot configuration │──── S203
│ information to a configuration indicated by second  │
│ slot configuration information                      │
└─────────────────────────────────────────────────────┘
```

(58) Field of Classification Search
CPC ............... H04J 14/0204; H04J 14/0205; H04J 14/0212; H04J 14/0213; H04Q 11/0005; H04Q 2011/0033; H04Q 2011/0045; H04Q 11/04; H04Q 2213/13389; H04Q 11/0062; H04Q 2011/0077; H04L 49/20; H04L 25/49; H04L 49/351; H04L 45/50; G02B 6/12033; G02B 6/12019

See application file for complete search history.

(56) References Cited

U.S. PATENT DOCUMENTS

| | | | | |
|---|---|---|---|---|
| 2016/0119076 | A1* | 4/2016 | Gareau | ............... H04Q 11/0066 398/49 |
| 2017/0005742 | A1* | 1/2017 | Gareau | .................. H04J 3/1658 |
| 2017/0005901 | A1* | 1/2017 | Gareau | ............... H04L 43/0811 |
| 2017/0005949 | A1* | 1/2017 | Gareau | ................. H04L 12/413 |
| 2017/0006360 | A1* | 1/2017 | Gareau | ................... G06F 13/40 |
| 2017/0093757 | A1* | 3/2017 | Gareau | ............... H04L 43/0864 |
| 2017/0171163 | A1* | 6/2017 | Gareau | .................... H04L 63/08 |
| 2018/0013511 | A1* | 1/2018 | Hussain | ............. H04J 14/0205 |
| 2018/0145928 | A1 | 5/2018 | Zhong et al. | |
| 2018/0167160 | A1* | 6/2018 | Gareau | ............. H03M 13/6522 |
| 2019/0229846 | A1* | 7/2019 | Liu | ........................... H04L 1/20 |
| 2019/0372717 | A1 | 12/2019 | Zhang et al. | |

FOREIGN PATENT DOCUMENTS

| | | |
|---|---|---|
| CN | 106357421 A | 1/2017 |
| CN | 106612559 A | 5/2017 |
| CN | 106911426 A | 6/2017 |
| EP | 3013017 A1 | 4/2016 |
| EP | 3537670 A1 | 9/2019 |
| WO | 2017070851 A1 | 5/2017 |
| WO | 2017121158 A1 | 7/2017 |

OTHER PUBLICATIONS

"Flex Ethernet 2.0, Implementation Agreement," OIF-FLEXE-02.0, Jun. 22, 2018, 51 pages.

ITU-T G.709/Y.1331, "Interfaces for the optical transport network Corrigendum 1," Aug. 2017, 248 pages.

Editor: "FlexE Implementation Agreement—Draft 1.3", ITU-T Draft; Study Period 2013-2016, International Telecommunication Union, Geneva; CH, Feb. 5, 2016, pp. 1-32, XP044165967.

* cited by examiner

| Block | SH | 0 1 2 3 4 5 6 7 | 8 | 9 | 10 | 11 | 12 13 14 15 16 | 17 18 19 20 21 21 22 23 24 25 26 27 28 29 30 31 | 32 33 34 35 | 36 37 38 39 40 41 42 43 44 45 46 47 | 48 ... 63 |
|---|---|---|---|---|---|---|---|---|---|---|---|
| 1 | 1 0 | 0x4B | C | OMF | RPF | Rcs | Flexible Ethernet group number | 0x5 | 0x000_0000 | |
| 2 | 0 1 | C | Flexible Ethernet map | Flexible Ethernet instance number | | | Reserved | | | |
| 3 | 0 1 | C | First slot field | | | Second slot field | | CR CA | Reserved | CRC-16 |
| 4 | 1 0 | | | | | | | | | |
| 5 | 1 0 | Management channel | | | | | | | | |
| 6 | 1 0 | | | | | | | | | |
| 7 | 1 0 | Management channel | | | | | | | | |
| 8 | 1 0 | | | | | | | | | |

FIG. 4

SERVICE DATA TRANSMISSION METHOD AND APPARATUS

CROSS-REFERENCE TO RELATED APPLICATIONS

This application is a continuation of International Patent Application No. PCT/CN2018/111841, filed on Oct. 25, 2018, which claims priority to Chinese Patent Application No. 201711051297.4, filed on Oct. 31, 2017, both of which are hereby incorporated by reference in their entireties.

TECHNICAL FIELD

This application relates to the communications field, and in particular, to a service data transmission method and apparatus.

BACKGROUND

In a flexible Ethernet (FlexE) 1.0 standard, time division multiplexing (TDM) slotting is performed on a 100-gigabit (Gb) Ethernet interface, 20 slots are obtained through division based on a FlexE overhead frame, and a 5 Gb slot granularity is introduced, that is, bandwidth of the 100 Gb physical interface is represented as 20 5 Gb-bandwidth slots. However, requirements for slots granularities may be different in different application scenarios. For example, in a higher-rate 200 Gb/400 Gb Ethernet interface scenario and a data center interconnection scenario, there may be a requirement for a coarser slot granularity, for example, 25 Gb or 50 Gb. In a fifth-generation (5G) mobile bearer scenario and a leased line service scenario, there is a requirement for a finer slot bandwidth granularity, for example, a 500 megabits (M) granularity for a common public radio interface (CPRI) service, a 1 Gb granularity or a 1.25 Gb granularity for a gigabit Ethernet (GE) service, or even a 100M granularity for a fast Ethernet (100M FE). To meet these requirements, in other approaches, a 5 Gb slot granularity already obtained through division is mainly used 5 Gb slot granularities are combined into a larger granularity group, for example, five 5 Gb granularities are bound to obtain a 25 Gb granularity, or the 5 Gb granularity is divided into smaller granularities, for example, the 5G slot granularity is further divided into five 1 Gb granularities.

However, a fixed slot granularity division method is still used in other approaches. Consequently, a slot granularity requirement of a service cannot be met in a timely manner.

SUMMARY

This application provides a service data transmission method and apparatus, to resolve a problem in other approaches that a slot granularity requirement of a service cannot be met in a timely manner because a fixed slot granularity division method is used.

According to a first aspect, this application provides a service data transmission method, including determining, by a first device, a switching request, where the switching request includes first slot configuration information and second slot configuration information, the switching request is used to request to switch a slot configuration of a FlexE connection instance from a configuration indicated by the first slot configuration information to a configuration indicated by the second slot configuration information, and a slot division quantity indicated by the first slot configuration information is different from a slot division quantity indicated by the second slot configuration information, and sending, by the first device, the switching request to a second device, where the first device is connected to the second device using a FlexE group including at least one FlexE connection instance.

In a possible design, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

In a possible design, the sending, by the first device, the switching request to a second device includes sending, by the first device, the switching request to the second device using a data transmission structure.

In a possible design, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

In a possible design, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

In a possible design, the sending, by the first device, the switching request to the second device using a data transmission structure includes sending, by the first device, the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

In a possible design, the third overhead code block further includes an indicator bit, and a value of the indicator bit is used to indicate whether the first slot length field and the second slot length field are valid.

In a possible design, the sending, by the first device, the switching request to the second device using a data transmission structure includes sending, by the first device, the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In a possible design, the overhead frame includes j overhead code blocks that are a management channel, and j is an integer greater than 0 and less than or equal to L, and the sending, by the first device, the switching request to the second device using a data transmission structure includes sending, by the first device, the switching request to the second device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

In a possible design, a third overhead code block of the overhead frame includes a switching indicator bit, and a value of the switching indicator bit is used to instruct to switch the configuration indicated by the first slot configuration information to the configuration indicated by the second slot configuration information.

In a possible design, after the sending, by the first device, the switching request to the second device, the method further includes receiving, by the first device, a switching response sent by the second device, and determining, by the first device, to start transmitting service data to the second device at a preset location based on the configuration indicated by the second slot configuration information.

In a possible design, the preset location is a start location of a next frame of a current data transmission frame.

According to a second aspect, this application provides a service data transmission method, including receiving, by a second device, a switching request sent by a first device, where the switching request includes first slot configuration information and second slot configuration information, the switching request is used to request to switch a slot configuration of a FlexE connection instance from a configuration indicated by the first slot configuration information to a configuration indicated by the second slot configuration information, and a slot division quantity indicated by the first slot configuration information is different from a slot division quantity indicated by the second slot configuration information, and determining, by the second device, to switch the slot configuration of the FlexE connection instance from the configuration indicated by the first slot configuration information to the configuration indicated by the second slot configuration information.

In a possible design, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

In a possible design, the receiving, by a second device, a switching request sent by a first device includes receiving, by the second device, the switching request sent by the first device using a data transmission structure.

In a possible design, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

In a possible design, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

In a possible design, the receiving, by the second device, the switching request sent by the first device using a data transmission structure includes receiving, by the second device, the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

Optionally, the third overhead code block further includes an indicator bit, and a value of the indicator bit is used to indicate whether the first slot length field and the second slot length field are valid.

In a possible design, the receiving, by the second device, the switching request sent by the first device using a data transmission structure includes receiving, by the second device, the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In a possible design, the overhead frame includes j overhead code blocks that are a management channel, and j is an integer greater than 0 and less than or equal to L, and the receiving, by the second device, the switching request sent by the first device using a data transmission structure includes receiving, by the second device, the switching request sent by the first device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

In a possible design, a third overhead code block of the overhead frame includes a switching indicator bit, and a value of the switching indicator bit is used to instruct to switch the configuration indicated by the first slot configuration information to the configuration indicated by the second slot configuration information.

In a possible design, after the receiving, by a second device, a switching request sent by a first device, the method further includes determining, by the second device, to start receiving, at a preset location based on the configuration indicated by the second slot configuration information, service data sent by the first device, and sending, by the second device, a switching response to the first device.

In a possible design, the preset location is a start location of a next frame of a current data transmission frame.

According to a third aspect, this application provides a service data transmission apparatus, including a determining module configured to determine a switching request, where the switching request includes first slot configuration information and second slot configuration information, the switching request is used to request to switch a slot configuration of a FlexE connection instance from a configuration indicated by the first slot configuration information to a configuration indicated by the second slot configuration information, and a slot division quantity indicated by the first slot configuration information is different from a slot division quantity indicated by the second slot configuration information, and a sending module configured to send the switching request to a second device, where the first device is connected to the second device using a FlexE group including at least one FlexE connection instance.

In a possible design, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

In a possible design, the sending module is further configured to send the switching request to the second device using a data transmission structure.

In a possible design, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

In a possible design, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

In a possible design, the sending module is further configured to send the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

In a possible design, the third overhead code block further includes an indicator bit, and a value of the indicator bit is used to indicate whether the first slot length field and the second slot length field are valid.

In a possible design, the sending module is further configured to send the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In a possible design, the overhead frame includes j overhead code blocks that are a management channel, and j is an integer greater than 0 and less than or equal to L, and the sending module is further configured to send the switching request to the second device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

In a possible design, a third overhead code block of the overhead frame includes a switching indicator bit, and a value of the switching indicator bit is used to instruct to switch the configuration indicated by the first slot configuration information to the configuration indicated by the second slot configuration information.

In a possible design, the apparatus further includes a receiving module configured to receive a switching response sent by the second device, where the determining module is further configured to determine to start transmitting service data to the second device at a preset location based on the configuration indicated by the second slot configuration information.

In a possible design, the preset location is a start location of a next frame of a current data transmission frame.

According to a fourth aspect, this application provides a service data transmission apparatus, including a receiving module configured to receive a switching request sent by a first device, where the switching request includes first slot configuration information and second slot configuration information, the switching request is used to request to switch a slot configuration of a FlexE connection instance from a configuration indicated by the first slot configuration information to a configuration indicated by the second slot configuration information, and a slot division quantity indicated by the first slot configuration information is different from a slot division quantity indicated by the second slot configuration information, and a determining module configured to determine to switch the slot configuration of the FlexE connection instance from the configuration indicated by the first slot configuration information to the configuration indicated by the second slot configuration information.

In a possible design, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

In a possible design, the receiving module is further configured to receive the switching request sent by the first device using a data transmission structure.

In a possible design, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

In a possible design, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

In a possible design, the receiving module is further configured to receive the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

In a possible design, the third overhead code block further includes an indicator bit, and a value of the indicator bit is used to indicate whether the first slot length field and the second slot length field are valid.

In a possible design, the receiving module is further configured to receive the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In a possible design, the overhead frame includes j overhead code blocks that are a management channel, and j is an integer greater than 0 and less than or equal to L, and the receiving module is further configured to receive the switching request sent by the first device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

In a possible design, a third overhead code block of the overhead frame includes a switching indicator bit, and a value of the switching indicator bit is used to instruct to switch the configuration indicated by the first slot configuration information to the configuration indicated by the second slot configuration information.

In a possible design, the apparatus further includes a sending module, where the determining module is further configured to determine to start receiving, at a preset location based on the configuration indicated by the second slot configuration information, service data sent by the first device, and the sending module is further configured to send a switching response to the first device.

In a possible design, the preset location is a start location of a next frame of a current data transmission frame.

According to a fifth aspect, this application provides a service data transmission apparatus, where the apparatus includes a processor and a memory, the memory is configured to store a program, and the processor invokes the program stored in the memory, to perform the method provided in the first aspect of this application.

According to a sixth aspect, this application provides a service data transmission apparatus, where the apparatus includes a processor and a memory, the memory is configured to store a program, and the processor invokes the program stored in the memory, to perform the method provided in the second aspect of this application.

According to a seventh aspect, this application provides a service data transmission apparatus, including at least one processing component (or chip) configured to perform the method in the first aspect.

According to an eighth aspect, this application provides a service data transmission apparatus, including at least one processing component (or chip) configured to perform the method in the second aspect.

According to a ninth aspect, this application provides a computer storage medium that includes a program, where the program is used to perform the method in the first aspect.

According to a tenth aspect, this application provides a computer storage medium that includes a program, where the program is used to perform the method in the second aspect.

According to the service data transmission method and apparatus provided in this application, the first device determines the switching request, and sends the switching request to the second device, where the switching request includes the first slot configuration information and the second slot configuration information, and is used to request to switch the slot configuration of the FlexE instance from the configuration indicated by the first slot configuration information to the configuration indicated by the second slot configuration information. After receiving the switching request, the second device determines to switch the configuration indicated by the first slot configuration information to the configuration indicated by the second slot configuration information. In this way, the slot configuration can be flexibly negotiated between the first device and the second device based on an actual service requirement, and the slot division quantity can be changed in a timely manner, thereby better meeting the service requirement and improving user experience.

BRIEF DESCRIPTION OF DRAWINGS

FIG. 4 is a schematic structural diagram of an overhead frame according to an embodiment of this application.

DESCRIPTION OF EMBODIMENTS

Figure 1:
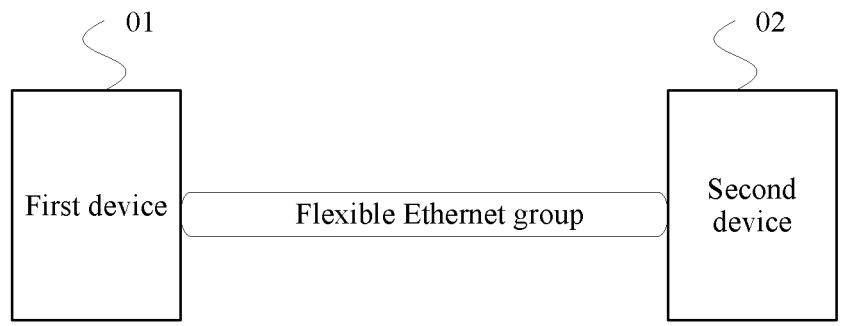
FIG. 1 is a schematic diagram of a communication architecture.

FIG. 1 is a schematic diagram of a communication architecture. As shown in FIG. 1, the communication structure includes a first device 01 and a second device 02. The first device 01 and the second device 02 are connected using a FlexE group including at least one FlexE connection instance (FlexE Instance).

It should be noted that, the FlexE group includes at least one two-way FlexE instance connection, and one of the first device and the second device at two ends is a sending party, and the other is a receiving party. Further, the first device and the second device are same devices, and may play different roles in different scenarios. For example, in a scenario, the first device is the sending party, and the second device is the receiving party. However, in another scenario, the first device may be the receiving party, and the second device is the sending party. This is not limited herein.

The FlexE instance includes periodic overhead code blocks and payload blocks in both receiving and sending directions.

In other approaches, when slot division is performed on a FlexE interface, a fixed slot division manner is mainly used. For example, 20 slots are fixedly obtained through division. In this case, a 100 Gb FlexE interface is divided into 20 5 Gb slots. Because the division manner cannot meet a slot granularity requirement of a service in a timely manner, this application provides a service data transmission method in which a flexible slot division manner is proposed.

Figure 2:
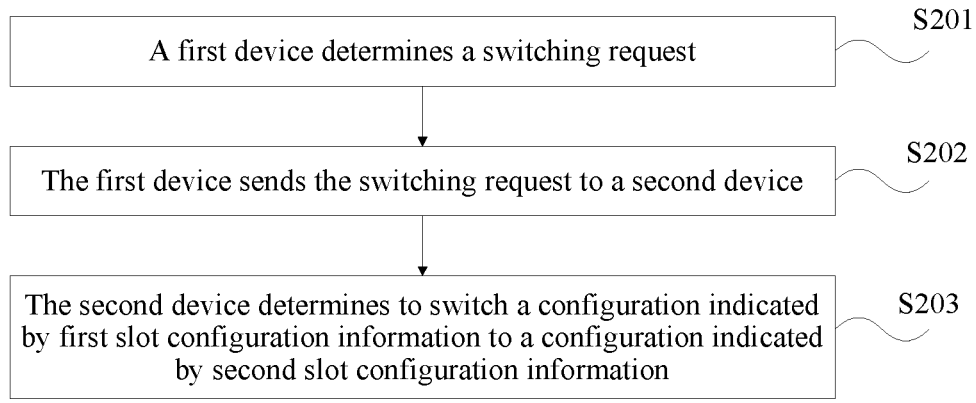
FIG. 2 is a schematic flowchart of a service data transmission method according to an embodiment of this application.

FIG. 2 is a schematic flowchart of a service data transmission method according to an embodiment of this application. As shown in FIG. 2, the method includes the following steps.

S201. A first device determines a switching request.

The switching request includes first slot configuration information and second slot configuration information. The switching request is used to request to switch a slot configuration of a FlexE instance from a configuration indicated by the first slot configuration information to a configuration indicated by the second slot configuration information.

A slot division quantity indicated by the first slot configuration information is different from a slot division quantity indicated by the second slot configuration information.

S202. The first device sends the switching request to a second device.

In an embodiment, in this application, specific slot division may be flexibly determined through negotiation between the first device and the second device. A first slot configuration may be a slot configuration being used in a current transmission process. When the first device considers that the slot configuration needs to be changed, the first device sends the switching request to the second device, to request to change the slot configuration to a second slot configuration.

S203. The second device determines to switch the configuration indicated by the first slot configuration information to the configuration indicated by the second slot configuration information.

After receiving the switching request, the second device may determine, based on the switching request, to switch the configuration indicated by the first slot configuration information to the configuration indicated by the second slot configuration information.

In this embodiment, the first device determines the switching request, and sends the switching request to the second device, where the switching request includes the first slot configuration information and the second slot configuration information, and is used to request to switch the slot configuration of the FlexE instance from the configuration indicated by the first slot configuration information to the configuration indicated by the second slot configuration information. After receiving the switching request, the second device determines to switch the configuration indicated by the first slot configuration information to the configuration indicated by the second slot configuration information. In this way, the slot configuration can be flexibly negotiated between the first device and the second device based on an actual service requirement, and the slot division quantity can be changed in a timely manner, thereby better meeting the service requirement and improving user experience.

Optionally, the first slot configuration information includes a first slot division quantity indication and a client signal identifier of each of Q slots obtained through division based on the first slot division quantity indication. The second slot configuration information includes a second slot division quantity indication and a client signal identifier of each of P slots obtained through division based on the second slot division quantity indication. Q and P are integers greater than 0.

Different client signal identifiers herein may be used to identify different services. After an Ethernet interface is divided into a plurality of slots, the slots may carry different services. When new slot division is indicated, a client signal identifier of each slot also needs to be indicated.

The first slot division quantity indication and the client signal identifier, of each of the Q slots obtained through division based on the first slot division quantity indication, that are included in the first slot configuration information indicate a slot division quantity currently being used and a current client signal identifier of each slot. The second slot configuration information indicates a slot division quantity used after the switching and a client signal identifier that is of each slot and that exists after the switching.

In specific implementation, the first device may send the switching request to the second device using a data transmission structure.

Optionally, the switching request further includes a switching indicator bit, and a value of the switching indicator bit is used to instruct to switch the slot configuration of the FlexE Instance from the configuration indicated by the first slot configuration information to the configuration indicated by the second slot configuration information.

It should be noted that, identified switching may vary with the value of the switching indicator bit. For example, if the value of the switching indicator bit is "1", it indicates that the slot configuration of the FlexE Instance is switched from the configuration indicated by the first slot configuration information to the configuration indicated by the second slot configuration information. If the value of the switching indicator bit is "0", it indicates that the slot configuration of the FlexE Instance is switched from the configuration indicated by the second slot configuration information to the configuration indicated by the first slot configuration information. The first device determines the value of the switching indicator bit based on switching that is further required currently.

The data transmission structure includes an overhead frame and payload blocks. The slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

More specifically, the data transmission structure may include one overhead multiframe. The overhead multiframe may further include k overhead frames. Each overhead frame includes L overhead code blocks. L and k are integers greater than 0.

Figure 3:
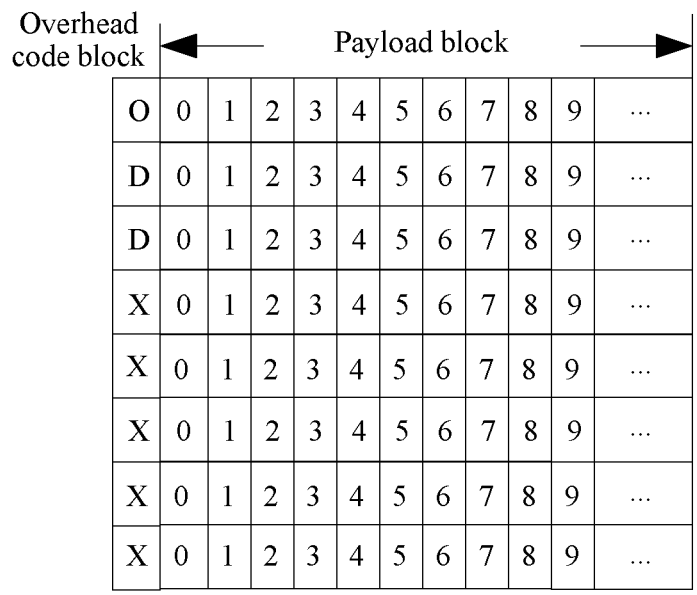
FIG. 3 is a schematic diagram of a data transmission structure in a service data transmission method according to an embodiment of this application.

FIG. 3 is a schematic diagram of a data transmission structure in a service data transmission method according to an embodiment of this application. As shown in FIG. 3, payload blocks corresponding to one overhead frame are used as an example. In the example in FIG. 3, L=8, in an embodiment, the overhead frame includes eight overhead code blocks (which are O, D, D, X, X, X, X, and X shown in FIG. 3), and the other blocks are all payload blocks, for example, the overhead frame may include 8*(20*1023) payload blocks, where * represents a multiplication sign. It should be noted that, "O" represents a command word code block (Order Set 64/66 b Block with Type), "D" represents a data type code block (Data type 64/66 b Block), and "X" represents a code block of an uncertain type.

Correspondingly, if one multiframe includes k overhead frames, the multiframe corresponds to 8*k*(20*1023) payload blocks. Optionally, a maximum value of k may be 32. In other words, when k=32, one multiframe corresponds to 8*32*(20*1023) payload blocks.

That L=8 and k=32 is used as an example in Table 1 to show slot division existing when n has different values.

TABLE 1

| Total quantity of payload blocks corresponding to an overhead multiframe | Payload block quantity per slot | Slot quantity n | Slot bandwidth | Total quantity of payload blocks corresponding to an overhead frame | Payload block quantity per slot | Slot quantity n | Slot bandwidth |
|---|---|---|---|---|---|---|---|
| 5237760 | 5237760 | 1 | 100 | 163680 | 163680 | 1 | 100 |
| 5237760 | 2618880 | 2 | 50 | 163680 | 81840 | 2 | 50 |
| 5237760 | 1745920 | 3 | 33.3333333 | 163680 | 54560 | 3 | 33.3333333 |
| 5237760 | 1309440 | 4 | 25 | 163680 | 40920 | 4 | 25 |
| 5237760 | 1047552 | 5 | 20 | 163680 | 32736 | 5 | 20 |
| 5237760 | 872960 | 6 | 16.6666667 | 163680 | 27280 | 6 | 16.6666667 |
| 5237760 | 748251.429 | 7 | 14.2857143 | 163680 | 23382.8571 | 7 | 14.2857143 |

TABLE 1-continued

| Total quantity of payload blocks corresponding to an overhead multiframe | Payload block quantity per slot | Slot quantity n | Slot bandwidth | Total quantity of payload blocks corresponding to an overhead frame | Payload block quantity per slot | Slot quantity n | Slot bandwidth |
|---|---|---|---|---|---|---|---|
| 5237760 | 654720 | 8 | 12.5 | 163680 | 20460 | 8 | 12.5 |
| 5237760 | 581973.333 | 9 | 11.1111111 | 163680 | 18186.6667 | 9 | 11.1111111 |
| 5237760 | 523776 | 10 | 10 | 163680 | 16368 | 10 | 10 |
| 5237760 | 476160 | 11 | 9.09090909 | 163680 | 14880 | 11 | 9.09090909 |
| 5237760 | 436480 | 12 | 8.33333333 | 163680 | 13640 | 12 | 8.33333333 |
| 5237760 | 402904.615 | 13 | 7.69230769 | 163680 | 12590.7692 | 13 | 7.69230769 |
| 5237760 | 374125.714 | 14 | 7.14285714 | 163680 | 11691.4286 | 14 | 7.14285714 |
| 5237760 | 349184 | 15 | 6.66666667 | 163680 | 10912 | 15 | 6.66666667 |
| 5237760 | 327360 | 16 | 6.25 | 163680 | 10230 | 16 | 6.25 |
| 5237760 | 308103.529 | 17 | 5.88235294 | 163680 | 9628.23529 | 17 | 5.88235294 |
| 5237760 | 290986.667 | 18 | 5.55555556 | 163680 | 9093.33333 | 18 | 5.55555556 |
| 5237760 | 275671.579 | 19 | 5.26315789 | 163680 | 8614.73684 | 19 | 5.26315789 |
| 5237760 | 261888 | 20 | 5 | 163680 | 8184 | 20 | 5 |
| 5237760 | 249417.143 | 21 | 4.76190476 | 163680 | 7794.28571 | 21 | 4.76190476 |
| 5237760 | 238080 | 22 | 4.54545455 | 163680 | 7440 | 22 | 4.54545455 |
| 5237760 | 227728.696 | 23 | 4.34782609 | 163680 | 7116.52174 | 23 | 4.34782609 |
| 5237760 | 218240 | 24 | 4.16666667 | 163680 | 6820 | 24 | 4.16666667 |
| 5237760 | 209510.4 | 25 | 4 | 163680 | 6547.2 | 25 | 4 |
| 5237760 | 201452.308 | 26 | 3.84615385 | 163680 | 6295.38462 | 26 | 3.84615385 |
| 5237760 | 193991.111 | 27 | 3.7037037 | 163680 | 6062.22222 | 27 | 3.7037037 |
| 5237760 | 187062.857 | 28 | 3.57142857 | 163680 | 5845.71429 | 28 | 3.57142857 |
| 5237760 | 180614.414 | 29 | 3.44827586 | 163680 | 5644.13793 | 29 | 3.44827586 |
| 5237760 | 174592 | 30 | 3.33333333 | 163680 | 5456 | 30 | 3.33333333 |
| 5237760 | 168960 | 31 | 3.22580645 | 163680 | 5280 | 31 | 3.22580645 |
| 5237760 | 163680 | 32 | 3.125 | 163680 | 5115 | 32 | 3.125 |

When m1 may be exactly divided by n, m may be equal to m1, or when m1 cannot be exactly divided by n, m that may be exactly divided by n may be used, but no limitation is imposed. For example, when n=4, m1=5237760 and may be exactly divided by n, that is, four slots are obtained through division, and each slot includes 1309440 payload blocks. For another example, when n=9, m1=5237760 and cannot be exactly divided by 9. In this case, some payload blocks may be removed, that is, these payload blocks are invalid, and remaining payload blocks are evenly divided into nine slots. For example, if m=5237757, after nine slots are obtained through division, each slot includes 581973 payload blocks. Herein, m is a largest value that is in values less than m1 and that can be exactly divided by n. Certainly, m may be another smaller value. This is not limited in this application herein.

Figure 5:
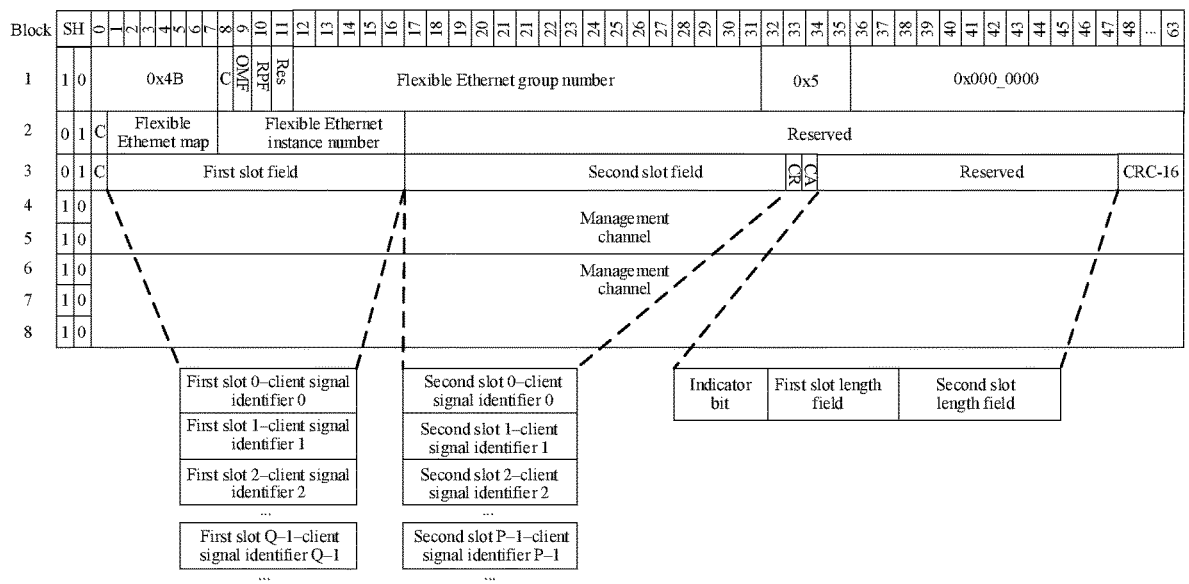
FIG. 5 is a schematic structural diagram of an overhead multiframe according to another embodiment of this application.
Figure 6:
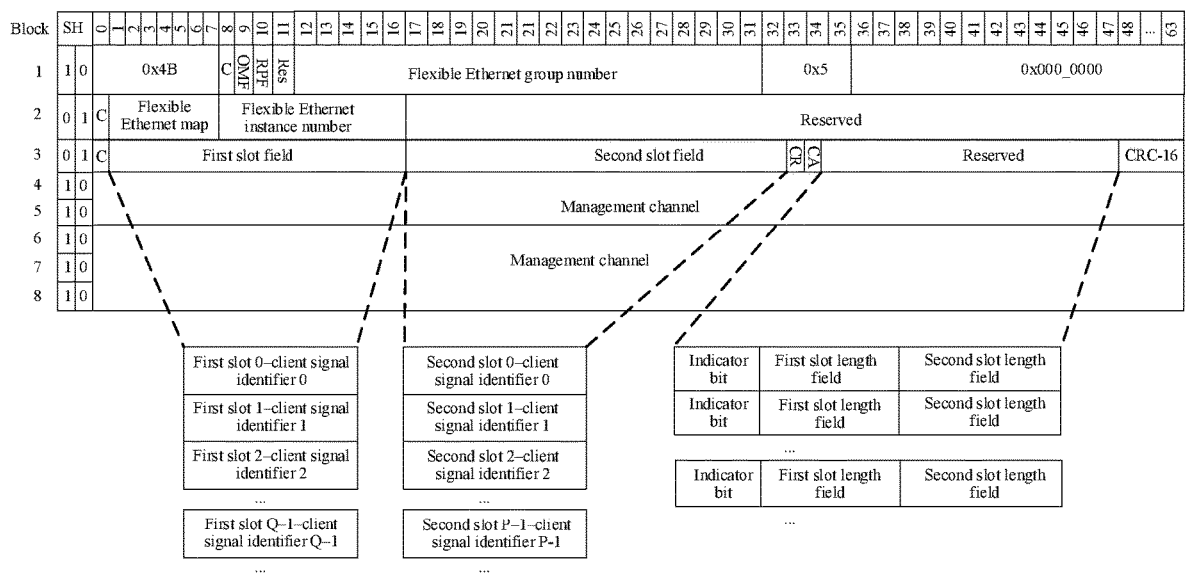
FIG. 6 is a schematic structural diagram of an overhead multiframe according to still another embodiment of this application.

FIG. 4 is a schematic structural diagram of an overhead frame according to an embodiment of this application. FIG. 5 is a schematic structural diagram of an overhead multiframe according to another embodiment of this application. FIG. 6 is a schematic structural diagram of an overhead multiframe according to still another embodiment of this application.

As shown in FIG. 4, that one overhead frame includes eight overhead code blocks is used as an example, and each row represents one overhead code block. Corresponding to FIG. 3, FIG. 4 shows specific content that is of the eight overhead code blocks and that is obtained through expansion.

A 64/66 b code block synchronization header (SH) column is used to indicate a type of an overhead code block in each row. In the example shown in FIG. 4, "10" represents a control type code block, and "01" represents a data type code block, but no limitation is imposed.

A first overhead code block, namely, the first row, includes "0x4 B" and "0x5" fields. The "0x4 B" and "0x5" fields serve as tag fields and are used to identify the first overhead code block. After a receive end identifies the first overhead code block, the receive end may receive a next overhead code block after further receiving 1023×20 64/66 b code blocks, and so on such that an entire overhead frame can be extracted from a code block stream, until an initial overhead code block that includes the "0x4 B" and "0x5" fields and that is in a next overhead frame. The first overhead code block further includes a "valid configuration table in use and switching indication (Calendar configuration in use, C)" field, an "overhead multiframe indicator (OMF)" field, a "remote member physical interface fault indicator (RPF)" field, a "FlexE group number" field, a "reserved (Res)" field, and a "0x000_0000" field. The "FlexE group number" field is used to transfer a number of a FlexE group to which an Ethernet interface belongs. For example, in an overhead multiframe, a "FlexE group number" field including 8*32=256 bits may indicate interface numbers "1 to 254".

A second overhead code block, namely, the second row, includes a "FlexE map" field, a "FlexE instance number" field, and a reserved field. The "FlexE map" field is used to indicate a distribution map of FlexEs included in a FlexE group to which an Ethernet interface belongs. The "FlexE instance number" field is used to indicate a number of a FlexE instance.

A third overhead code block, namely, the third row, includes a first slot field (denoted as "client carried calendar A"), a second slot field (denoted as "client carried calendar B"), a reserved field, a "slot switch request (CR)" field, and a "slot switch acknowledgment (Calendar Switch Acknowledge, CA)" field. The first slot field and the second slot field each are used to carry a client signal identifier, that is, used to indicate services corresponding to different slots.

The value of the switching indicator bit may be added to the "CR" field of the third overhead code block. In other words, the "CR" field serves as the switching indicator bit.

A fourth overhead code block and a fifth overhead code block are a management channel, and further, may be a "section management channel (Management Channel Section (two 66 B blocks))".

A sixth overhead code block, a seventh overhead code block, and an eighth overhead code block may also be a management channel, and further, may be a "FlexE shim management channel (Management Channel shim to shim (three 66 B blocks))".

Further, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

Specifically, the first slot field in the third overhead code block may carry the client signal identifier of each of the Q slots obtained through division based on the first slot division quantity indication, and the second slot field may carry the client signal identifier of each of the P slots obtained through division based on the second slot division quantity indication, but no limitation is imposed. Alternatively, the second slot field may carry the client signal identifier of each of the Q slots obtained through division based on the first slot division quantity indication, and the first slot field may carry the client signal identifier of each of the P slots obtained through division based on the second slot division quantity indication. This may be preconfigured.

In a specific implementation process, there may be at least the following manners in which the first device sends the switching request to the second device using the data transmission structure.

(1) The first device sends the switching request to the second device using the overhead multiframe.

As shown in FIG. 5, a third overhead code block of the overhead multiframe includes a first slot field and a second slot field, the first slot field carries the client signal identifier of each of the Q slots obtained through division based on the first slot division quantity indication, and the second slot field carries the client signal identifier of each of the P slots obtained through division based on the second slot division quantity indication.

Referring to FIG. 5, the overhead multiframe further includes a first slot length field and a second slot length field, the first slot length field carries the first slot division quantity indication, and the second slot length field carries the second slot division quantity indication. Specifically, the first slot length field indicates a value of Q, and the second slot length field indicates a value of P.

The first slot field is multiplexed Q times for the client signal identifiers respectively corresponding to the Q slots. Correspondingly, the second slot field is multiplexed P times for the client signal identifiers respectively corresponding to the P slots. When the first slot length field indicates that the value of Q is 20, corresponding slot bandwidth is 5 Gb. When the second slot length field indicates that the value of P is 4, corresponding slot bandwidth is 25 Gb.

Optionally, the first slot length field and the second slot length field may be located in the third overhead code block, or may be located in a second overhead code block, for example, occupy an original reserved bit in the second overhead code block.

It should be noted that, maximum values that are of Q and P and that can be supported by the overhead multiframe are 64. Assuming that Q=20, remaining bits may be used as reserved bits without carrying any content. This is not limited in this application.

Optionally, as shown in FIG. 5, the third overhead code block further includes an indicator bit, and a value of the indicator bit is used to indicate whether the first slot length field and the second slot length field are valid. For example, when the value of the indicator bit is "1", it indicates that the first slot length field and the second slot length field are used to indicate the first slot division quantity and the second slot division quantity indication. When the value of the indicator bit is "0", it indicates default, in an embodiment, locations of the first slot length field and the second slot length field in FIG. 5 are still reserved bits.

Further, as shown in FIG. 5, the first slot length field and the second slot length field may be carried when the first overhead frame is sent, and the indicator bit may be carried when the first overhead frame is sent.

Alternatively, as shown in FIG. 6, each overhead frame may carry the first slot length field and the second slot length field, and each overhead frame may carry the indicator bit. A value of each indicator bit may be 1 or 0, but no limitation is imposed. The indicator bit may be 0 in an overhead frame that carries no client signal identifier.

It should be noted that, the indicator bit does not necessarily exist, and bit quantities of the first slot length field and the second slot length field may be flexibly configured as required. For example, if a 100 Gb FlexE Instance needs to be expanded to support division into a 1 Gb granularity, lengths of the first slot length field and the second slot length field need to be at least 7 bits.

Figure 7:
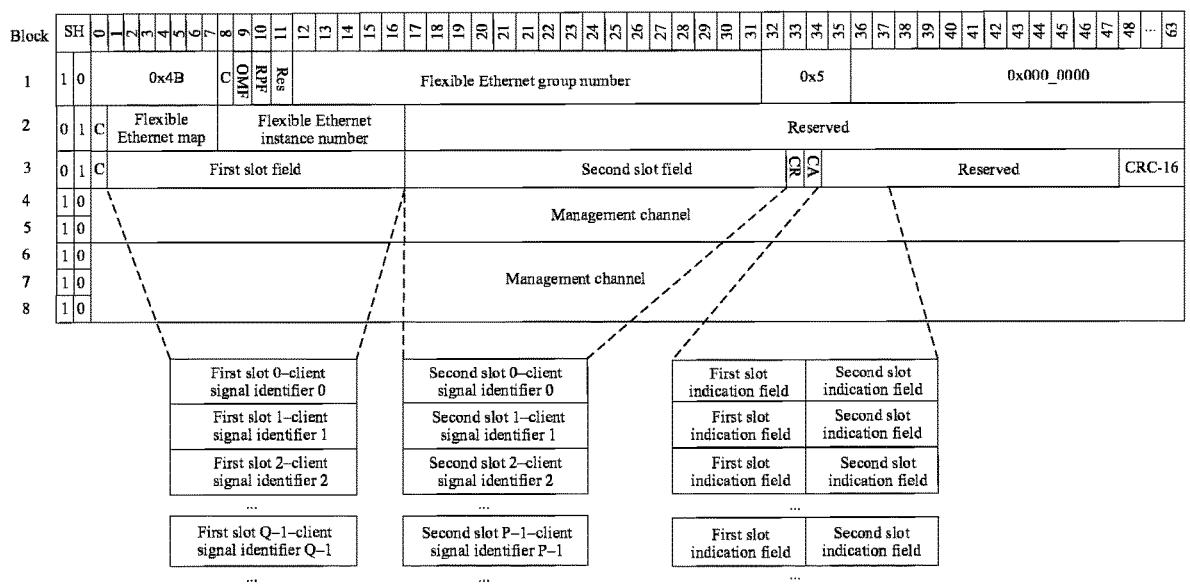
FIG. 7 is a schematic structural diagram of an overhead multiframe according to another embodiment of this application.

FIG. 7 is a schematic structural diagram of an overhead multiframe according to another embodiment of this application.

(2) The first device sends the switching request to the second device using the overhead multiframe.

As shown in FIG. 7, a third overhead code block of the overhead multiframe includes a first slot field and a second slot field, the first slot field carries the client signal identifier of each of the Q slots obtained through division based on the first slot division quantity, and the second slot field carries the client signal identifier of each of the P slots obtained through division based on the second slot division quantity indication.

The overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

Specifically, each overhead frame carries the first slot field, the second slot field, the first slot indication field, and the second slot indication field once. The first overhead frame is used as an example. The first slot field carries a client signal identifier corresponding to one of the Q slots obtained through division based on the first slot division quantity, and the client signal identifier is denoted as "first slot 0-client signal identifier 0". Correspondingly, the first slot indication field indicates whether "first slot 0-client signal identifier 0" is valid. For example, if a value of the first slot indication field is "1", it indicates that "first slot 0-client signal identifier 0" is valid, or if a value of the first slot indication field is "0", it indicates that "first slot 0-client signal identifier 0" is invalid. Similarly, the second slot field carries "second slot 0-client signal identifier 0", and the second slot indication field indicates whether "second slot 0-client signal identifier 0" is valid. Further, a slot division quantity may be indicated based on a quantity of client signal identifiers that are indicated as being valid. For example, if Q first slot indication fields are "1", and indicate that corresponding client signal identifiers are valid, it indicates that a first slot division quantity is Q. Similarly, if P second slot indication fields are "1", and indicate that corresponding client signal identifiers are valid, it indicates that a second slot division quantity is P.

Optionally, the first slot indication field and the second slot indication field may be located in the third overhead code block, or may be located in a second overhead code block, for example, occupy an original reserved bit in the second overhead code block.

(3) The overhead frame may include j overhead code blocks that are a management channel, and j is an integer greater than 0 and less than or equal to L. In the examples shown in FIG. 4 to FIG. 7, j may be 2 or 3. For example, the overhead frame may include a management channel including a fourth overhead code block and a fifth overhead code block, or a management channel including a sixth overhead code block to an eighth overhead code block.

Corresponding, that the first device sends the switching request to the second device using the data transmission structure may be further that the first device sends the switching request to the second device through the management channel.

The management channel carries a first slot configuration table and a second slot configuration table. The first slot configuration table includes n1 slot identifiers and client signal identifiers of n1 slots, and n1 is a quantity indicated by the first slot division quantity indication. The second slot configuration table includes n2 slot identifiers and client signal identifiers of n2 slots, and n2 is a quantity indicated by the second slot division quantity indication.

For example, the first slot configuration table may be shown in Table 2.

TABLE 2

| Slot identifier | Client signal identifier |
| --- | --- |
| 1 | Client identifier 1 |
| 2 | Client identifier 1 |
| ... | ... |
| n1 | Client identifier n1 |

The second slot configuration table is similar to the first slot configuration table, and details are not described herein again.

After sending the switching request to the second device, the first device may further receive a switching response sent by the second device such that the first device determines to start transmitting service data to the second device at a preset location based on the configuration indicated by the second slot configuration information.

Specifically, after receiving the switching request, if the second device agrees on the switching, the second device sends the switching response, and enables the configuration indicated by the second slot configuration information. After receiving the switching response, the first device also enables the configuration indicated by the second slot configuration information, determines a start time according to a preset rule, and starts transmitting the service data at the start time based on the configuration indicated by the second slot configuration information. Correspondingly, the second device receives, at the start time based on the configuration indicated by the second slot configuration information, the service data transmitted by the first device. Enabling the configuration indicated by the second slot configuration information may be performing slot division on the FlexE group based on the indication of the second slot configuration information.

The start time may be a start boundary of a next frame of a frame currently used to transmit the service data, but no limitation is imposed, or may be a start boundary of a frame that is a preset quantity of specified frames after a frame currently used to transmit the service data.

Optionally, the second device sends the switching response to the first device using an overhead frame. For a structure of the overhead frame, refer to FIG. 4. The overhead frame used to transmit the switching response may carry a response indicator bit, and the response indicator bit is used to instruct the second device to determine a slot configuration to be switched to. For example, when the response indicator bit is "0", the second device determines to switch from the configuration indicated by the second configuration information to the configuration indicated by the first slot configuration information, or when the response indicator bit is "1", the second device determines to switch from the configuration indicated by the first configuration information to the configuration indicated by the second slot configuration information.

As shown in FIG. 4, the switching indicator bit may be the "CA" field in the third overhead code block of the overhead frame.

Optionally, the switching indicator bit may be alternatively three "C" fields in the overhead frame. If the three "C" fields are "1", it indicates that the first device starts transmitting the service data at the start time based on the configuration indicated by the second slot configuration information. If the three "C" fields are "0", it indicates that the first device starts transmitting the service data at the start time based on the configuration indicated by the first slot configuration information. This application is not limited thereto.

Figure 8:
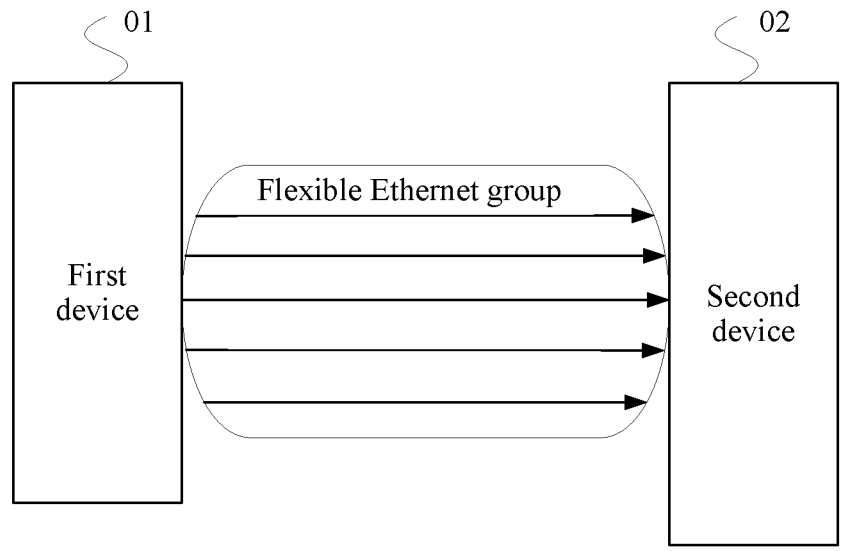
FIG. 8 is a schematic diagram of a slot configuration according to an embodiment of this application.

FIG. 8 is a schematic diagram of a slot configuration according to an embodiment of this application. Flexible slot division may be implemented using the foregoing method. After a new slot configuration is switched to, a block of a service is transmitted based on the new slot division configuration. As shown in FIG. 8, it is assumed that 100 Gb is divided into five slots, and each slot is 20 Gb. Five blocks are to be extracted from a block stream of the service in each period, and are placed at corresponding locations in the slot.

Figure 9:
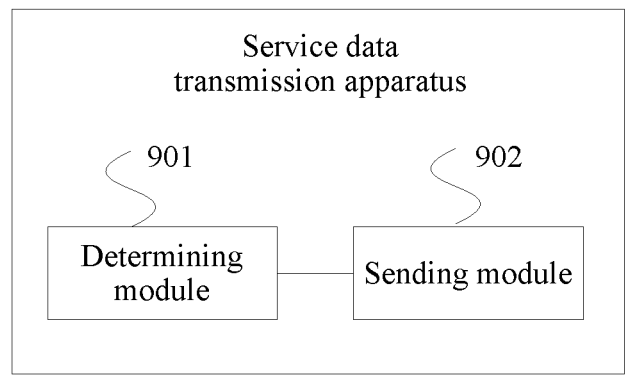
FIG. 9 is a schematic structural diagram of a service data transmission apparatus according to an embodiment of this application.

FIG. 9 is a schematic structural diagram of a service data transmission apparatus according to an embodiment of this application. As shown in FIG. 9, the apparatus includes a determining module 901 and a sending module 902.

The determining module 901 is configured to determine a switching request, where the switching request includes first slot configuration information and second slot configuration information, the switching request is used to request to switch a slot configuration of a FlexE Instance from a configuration indicated by the first slot configuration information to a configuration indicated by the second slot configuration information, and a slot division quantity indicated by the first slot configuration information is different from a slot division quantity indicated by the second slot configuration information.

The sending module 902 is configured to send the switching request to a second device, where the first device is connected to the second device using a FlexE group including at least one FlexE Instance.

In this application, the first device determines the switching request, and sends the switching request to the second device, where the switching request includes the first slot configuration information and the second slot configuration information, and is used to request to switch the slot configuration of the FlexE instance from the configuration indicated by the first slot configuration information to the configuration indicated by the second slot configuration information. After receiving the switching request, the second device determines to switch the configuration indicated by the first slot configuration information to the configuration indicated by the second slot configuration information. In this way, the slot configuration can be flexibly negotiated between the first device and the second device based on an actual service requirement, and the slot division quantity can be changed in a timely manner, thereby better meeting the service requirement and improving user experience.

Optionally, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

Optionally, the sending module 902 is further configured to send the switching request to the second device using a data transmission structure.

In a possible design, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

In a possible design, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

Optionally, the sending module 902 is further configured to send the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

In a possible design, the third overhead code block further includes an indicator bit, and a value of the indicator bit is used to indicate whether the first slot length field and the second slot length field are valid.

In another possible design, the sending module 902 is further configured to send the switching request to the second device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In another implementation, the overhead frame includes j overhead code blocks that are a management channel, and j is an integer greater than 0 and less than or equal to L, and the sending module 902 is further configured to send the switching request to the second device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

Optionally, a third overhead code block of the overhead frame includes a switching indicator bit, and a value of the switching indicator bit is used to instruct to switch the configuration indicated by the first slot configuration information to the configuration indicated by the second slot configuration information.

Figure 10:
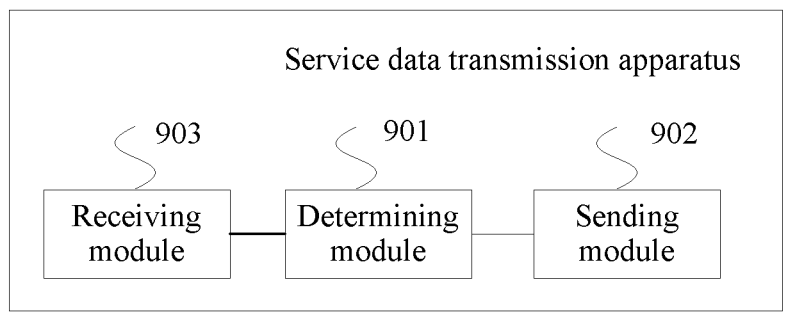
FIG. 10 is a schematic structural diagram of a service data transmission apparatus according to another embodiment of this application.

FIG. 10 is a schematic structural diagram of a service data transmission apparatus according to another embodiment of this application. As shown in FIG. 10, based on FIG. 9, the apparatus further includes a receiving module 903 configured to receive a switching response sent by the second device.

The determining module 901 is further configured to determine to start transmitting service data to the second device at a preset location based on the configuration indicated by the second slot configuration information.

In a possible design, the preset location is a start location of a next frame of a current data transmission frame.

Figure 11:
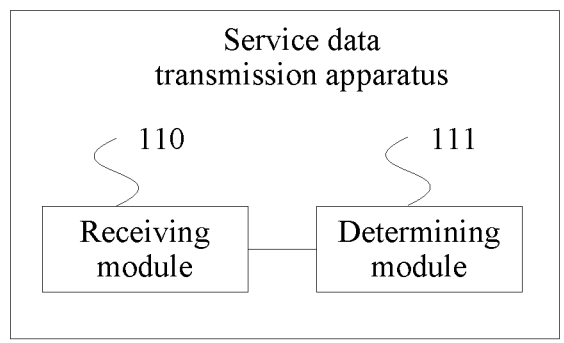
FIG. 11 is a schematic structural diagram of a service data transmission apparatus according to still another embodiment of this application.

FIG. 11 is a schematic structural diagram of a service data transmission apparatus according to still another embodiment of this application. As shown in FIG. 11, the apparatus includes a receiving module 110 and a determining module 111.

The receiving module 110 is configured to receive a switching request sent by a first device, where the switching request includes first slot configuration information and second slot configuration information, the switching request is used to request to switch a slot configuration of a FlexE Instance from a configuration indicated by the first slot configuration information to a configuration indicated by the second slot configuration information, and a slot division quantity indicated by the first slot configuration information is different from a slot division quantity indicated by the second slot configuration information.

The determining module 111 is configured to determine to switch the slot configuration of the FlexE Instance from the configuration indicated by the first slot configuration information to the configuration indicated by the second slot configuration information.

In a possible design, the first slot configuration information includes a first slot division quantity indication and a client signal identifier of each of Q slots obtained through division based on the first slot division quantity indication, the second slot configuration information includes a second slot division quantity indication and a client signal identifier of each of P slots obtained through division based on the second slot division quantity indication, and Q and P are integers greater than 0.

Optionally, the receiving module 110 is further configured to receive the switching request sent by the first device using a data transmission structure.

Optionally, the slot division quantity n indicated by the second slot configuration information indicates that m payload blocks in the data transmission structure are evenly allocated to n slots, a quotient obtained by dividing m by n is an integer, and m is less than or equal to a total quantity m1 of payload blocks in the data transmission structure.

In a possible design, the data transmission structure includes one overhead multiframe, the overhead multiframe includes k overhead frames, and each overhead frame includes L overhead code blocks, and L and k are integers greater than 0.

Further, the overhead multiframe carries the client signal identifier of each of the Q slots obtained through division based on the first slot division quantity indication and the client signal identifier of each of the P slots obtained through division based on the second slot division quantity indication, and Q and P are integers greater than 0 and less than or equal to k.

In a possible design, the receiving module 110 is further configured to receive the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot length field and a second slot length field, the first slot length field carries the first slot division quantity indication, and the second slot length field carries the second slot division quantity indication.

In a possible design, the third overhead code block further includes an indicator bit, and a value of the indicator bit is used to indicate whether the first slot length field and the second slot length field are valid.

Optionally, the receiving module 110 is further configured to receive the switching request sent by the first device using the overhead multiframe, where a third overhead code block of the overhead multiframe includes a first slot field and a second slot field, the first slot field carries the client signal identifier of each of the Q slots obtained through division based on the first slot division quantity indication, the second slot field carries the client signal identifier of each of the P slots obtained through division based on the second slot division quantity indication, the overhead multiframe further includes a first slot indication field and a second slot indication field, the first slot indication field is used to indicate whether a field of the client signal identifier of each of the Q slots obtained through division based on the first slot division quantity indication is valid, and the second slot indication field is used to indicate whether a field of the client signal identifier of each of the P slots obtained through division based on the second slot division quantity indication is valid.

In a possible design, the overhead frame includes j overhead code blocks that are a management channel, and j is an integer greater than 0 and less than or equal to L.

Optionally, the receiving module 110 is further configured to receive the switching request sent by the first device through the management channel, where the management channel carries a first slot configuration table and a second slot configuration table, the first slot configuration table includes n1 slot identifiers and client signal identifiers of n1 slots, n1 is a quantity indicated by the first slot division quantity indication, the second slot configuration table includes n2 slot identifiers and client signal identifiers of n2 slots, and n2 is a quantity indicated by the second slot division quantity indication.

Optionally, a third overhead code block of the overhead frame includes a switching indicator bit, and a value of the switching indicator bit is used to instruct to switch the configuration indicated by the first slot configuration information to the configuration indicated by the second slot configuration information.

Figure 12:
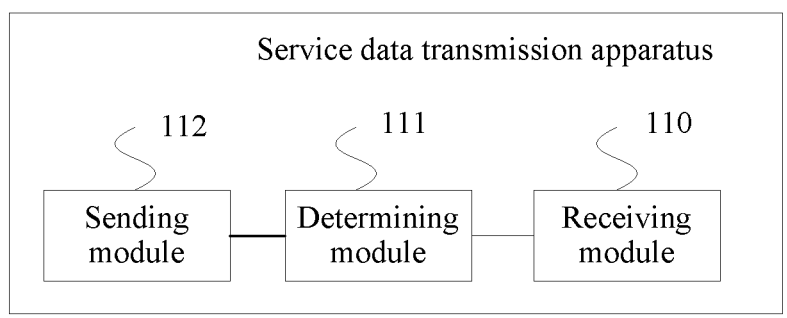
FIG. 12 is a schematic structural diagram of a service data transmission apparatus according to another embodiment of this application.

FIG. 12 is a schematic structural diagram of a service data transmission apparatus according to another embodiment of this application. As shown in FIG. 12, based on FIG. 11, the apparatus further includes a sending module 112.

The determining module 111 is further configured to determine to start receiving, at a preset location based on the configuration indicated by the second slot configuration information, service data sent by the first device.

Correspondingly, the sending module 112 is further configured to send a switching response to the first device.

Further, the preset location is a start location of a next frame of a current data transmission frame.

The apparatus is configured to perform the method embodiments, and an implementation principle and a technical effect of the apparatus are similar to those of the method embodiments. Details are not described herein again.

It should be noted that, division of the modules of the foregoing device is merely logical function division. In actual implementation, the modules may be all or partially integrated into one physical entity, or may be physically separated. In addition, these modules may all be implemented in a form of software invoked using a processing element, or may all be implemented in a form of hardware, or some modules may be implemented in a form of software invoked using a processing element, and some modules are implemented in a form of hardware. For example, the determining module may be an independently disposed processing element, or may be integrated into a chip of the foregoing device for implementation. In addition, the determining module may be alternatively stored into a memory of the foregoing device in a form of program code, and is invoked by a processing element of the foregoing device, to perform a function of the determining module. Implementation of other modules is similar this. In addition, these modules may be all or partially integrated, or may be implemented independently. The processing element herein may be an integrated circuit and has a signal processing capability. In an implementation process, steps in the foregoing methods or the foregoing modules can be implemented using a hardware integrated logical circuit in the processing element, or using instructions in a form of software.

For example, the foregoing modules may be configured as one or more integrated circuits for implementing the foregoing method, for example, one or more application-specific integrated circuits (ASIC), or one or more microprocessors, or one or more field programmable gate arrays (FPGA). For another example, when one of the foregoing modules is implemented in a form of scheduling program code using a processing element, the processing element may be a general purpose processor, for example, a central processing unit (CPU) or another processor that can invoke the program code. For another example, these modules may be integrated together, and implemented in a form of a system-on-a-chip (SOC).

Figure 13:
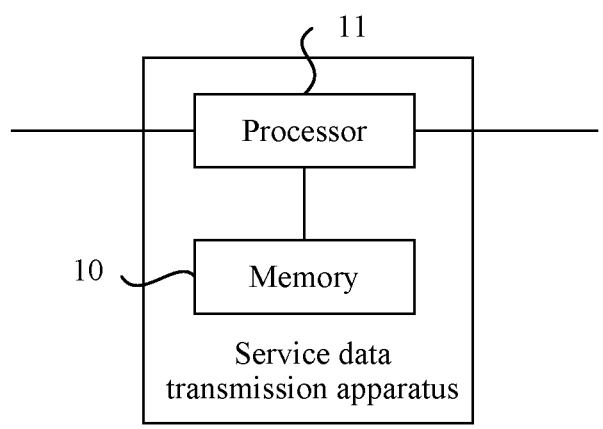
FIG. 13 is a schematic structural diagram of a service data transmission apparatus according to another embodiment of this application.

FIG. 13 is a schematic structural diagram of a service data transmission apparatus according to another embodiment of this application. The apparatus may be the first device or the second device. As shown in FIG. 13, the apparatus includes a memory 10 and a processor 11.

The memory 10 may be an independent physical unit, and may be connected to the processor 11 using a bus. Alternatively, the memory 10 may be integrated with the processor 11, and implemented using hardware, or the like.

The memory 10 is configured to store a program for implementing the method embodiments or the modules in the embodiments shown in FIG. 9 to FIG. 12. The processor 11 invokes the program to perform operations in the method embodiments.

Optionally, when the service data transmission method in the foregoing embodiments is all or partially implemented using software, the foregoing apparatus may alternatively include only the processor. The memory configured to store the program is located outside an access device. The processor is connected to the memory using a circuit/wire, and is configured to read and execute the program stored in the memory.

The processor may be a CPU, a network processor (NP), or a combination of a CPU and an NP.

The processor may further include a hardware chip. The hardware chip may be an ASIC, a programmable logic device (PLD), or a combination thereof. The PLD may be a complex programmable logic device (CPLD), an FPGA, generic array logic (GAL), or any combination thereof.

The memory may include a volatile memory, for example, a random-access memory (RAM), or the memory may include a non-volatile memory, for example, a flash memory, a hard disk drive (HDD), or a solid-state drive (SSD), or the memory may include a combination of the foregoing types of memories.

An embodiment of this application further provides a computer storage medium that stores a computer program, and the computer program is used to perform the service data transmission method provided in the foregoing embodiments.

An embodiment of this application further provides a computer program product including an instruction, and when the computer program product is run on a computer, the computer is enabled to perform the service data transmission method provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc-read only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine such that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

What is claimed is:

1. A service data transmission method, implemented by a first device, wherein the service data transmission method comprises:
    determining a switching request comprising first slot configuration information and second slot configuration information, wherein the switching request requests to switch a flexible Ethernet connection instance from a first configuration indicated by the first slot configuration information to a second configuration indicated by the second slot configuration information, and wherein the first slot configuration information indicates a first slot division quantity and the second slot configuration information indicates a second slot division quantity that is different than the first slot division quantity for a same connection rate; and
    sending the switching request to a second device, wherein the first device is connected to the second device using a flexible Ethernet group comprising at least one flexible Ethernet connection instance.

2. The service data transmission method of claim 1, wherein the first slot configuration information comprises a first slot division quantity indication and a first client signal identifier of each of a first plurality of slots obtained through division of a FlexE interface by the first slot division quantity indication, wherein the second slot configuration information comprises a second slot division quantity indication and a second client signal identifier of each of a second plurality of slots obtained through division of the FlexE interface by the second slot division quantity indication.

3. The service data transmission method of claim 2, wherein sending the switching request to the second device comprises sending the switching request to the second device using a data transmission structure.

4. The service data transmission method of claim 3, wherein the second slot division quantity indicates that a plurality of payload blocks in the data transmission structure is evenly allocated to a quantity of slots.

5. The service data transmission method of claim 3, wherein the data transmission structure comprises an overhead multiframe comprising a plurality of overhead frames, and wherein each of the plurality of overhead frames comprises a quantity of overhead code blocks.

6. The service data transmission method of claim 5, wherein the overhead multiframe carries the first client signal identifier and the second client signal identifier.

7. The service data transmission method of claim 6, wherein sending the switching request to the second device comprises sending the switching request to the second device using the overhead multiframe, wherein a third overhead code block of the overhead multiframe comprises:
a first slot field comprising the first client signal identifier; and
a second slot field comprising the second client signal identifier, and wherein the overhead multiframe further comprises:
a first slot length field comprising the first slot division quantity indication; and
a second slot length field comprising the second slot division quantity indication.

8. The service data transmission method of claim 7, wherein the third overhead code block further comprises an indicator bit, and wherein a value of the indicator bit indicates whether the first slot length field and the second slot length field are valid.

9. The service data transmission method of claim 6, wherein sending the switching request to the second device comprises sending the switching request to the second device using the overhead multiframe, wherein a third overhead code block of the overhead multiframe comprises:
a first slot field comprising the first client signal identifier; and
a second slot field comprising the second client signal identifier, and wherein the overhead multiframe further comprises:
a first slot indication field indicating whether a field of the first client signal identifier is valid; and
a second slot indication field indicating whether a field of the second client signal identifier is valid.

10. The service data transmission method of claim 6, wherein the overhead frame comprises a plurality of overhead code blocks that are a management channel, wherein sending the switching request to the second device comprises sending the switching request to the second device through the management channel, wherein the management channel carries a first slot configuration table and a second slot configuration table, wherein the first slot configuration table comprises a first quantity of slot identifiers and a first plurality of client signal identifiers, and wherein the second slot configuration table comprises a second quantity of slot identifiers and a second plurality of client signal identifiers.

11. The service data transmission method of claim 5, wherein a third overhead code block of the overhead frame comprises a switching indicator bit, and wherein a value of the switching indicator bit instructs to switch the first configuration to the second configuration.

12. The service data transmission method of claim 1, after sending the switching request to the second device, the service data transmission method further comprises:
receiving a switching response from the second device; and
determining to start transmitting service data to the second device at a preset location based on the second configuration.

13. The service data transmission method of claim 12, wherein the preset location is a start location of a next frame of a current data transmission frame.

14. A service data transmission method, implemented by a second device, wherein the service data transmission method comprises:
receiving a switching request from a first device, wherein the switching request comprises first slot configuration information and second slot configuration information, wherein the switching request requests to switch a flexible Ethernet connection instance from a first configuration indicated by the first slot configuration information to a second configuration indicated by the second slot configuration information, and wherein the first slot configuration information indicates a first slot division quantity and the second slot configuration information indicates a second slot division quantity that is different than the first slot division quantity for a same connection rate; and
determining to switch the flexible Ethernet connection instance from the first configuration to the second configuration.

15. The service data transmission method of claim 14, wherein the first slot configuration information comprises a first slot division quantity indication and a first client signal identifier of each of a first plurality of slots obtained through division of a FlexE interface by the first slot division quantity indication, and wherein the second slot configuration information comprises a second slot division quantity indication and a second client signal identifier of each of a second plurality of slots obtained through division of a FlexE interface by the second slot division quantity indication.

16. A first device, comprising:
a processor configured to determine a switching request comprising first slot configuration information and second slot configuration information, wherein the switching request requests to switch a flexible Ethernet connection instance from a first configuration indicated by the first slot configuration information to a second configuration indicated by the second slot configuration information, and wherein the first slot configuration information indicates a first slot division quantity and the second slot configuration information indicates a second slot division quantity that is different than the first slot division quantity for a same connection rate; and
a transceiver coupled to the processor and is configured to send the switching request to a second device, wherein the first device is connected to the second device using a flexible Ethernet group comprising at least one flexible Ethernet connection instance.

17. The first device of claim 16, wherein the first slot configuration information comprises a first slot division quantity indication and a first client signal identifier of each of a first plurality of slots obtained through division based on the first slot division quantity indication, wherein the second slot configuration information comprises a second slot division quantity indication and a second client signal identifier of each of a second plurality of slots obtained through division based on the second slot division quantity indication.

18. The first device of claim 17, wherein the transceiver is further configured to send the switching request to the second device using a data transmission structure.

19. The first device of claim 18, wherein the second slot division quantity indicated by the second slot configuration information indicates that a plurality of payload blocks in the data transmission structure are evenly allocated to a quantity of slots.

20. The first device of claim 18, wherein the data transmission structure comprises an overhead multiframe comprising a plurality of overhead frames, and wherein each of the plurality of overhead frames comprises a quantity of overhead code blocks.

* * * * *